(No Model.)
P. W. MACKENZIE.
APPARATUS FOR PRODUCING ILLUMINATING GAS.
No. 246,962. Patented Sept. 13, 1881.
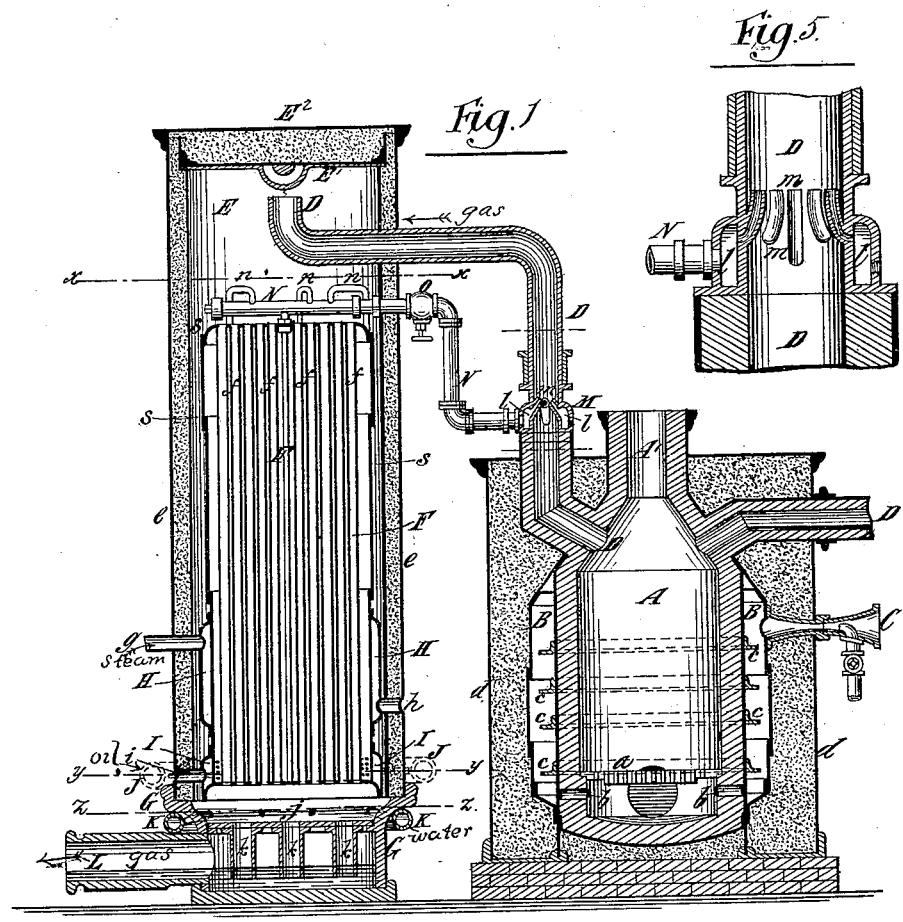
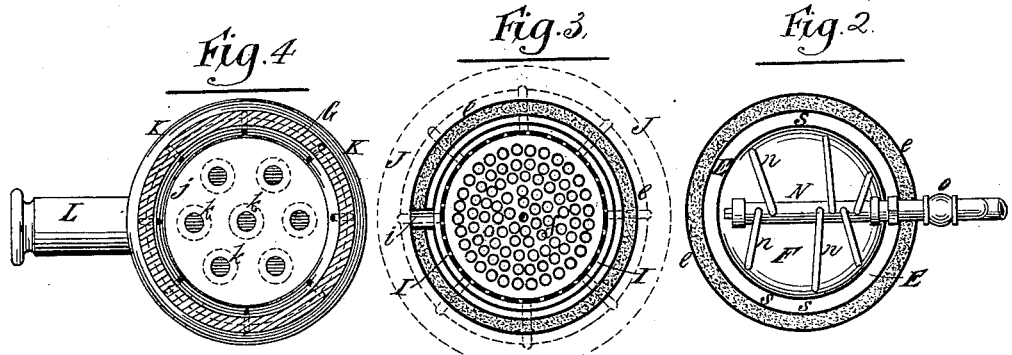
Witnesses:—
Louis M. Whitehead
Fred F. Haynes
Inventor:—
P. W. Mackenzie
by his Attorneys
Brown & Brown
N. PETERS, Photo-Lithographer, Washington, D. C.

UNITED STATES PATENT OFFICE.

PHILIP W. MACKENZIE, OF BLAUVELTVILLE, ASSIGNOR TO THE MACKENZIE & SAYRE MANUFACTURING COMPANY, OF NEW YORK, N. Y.

APPARATUS FOR PRODUCING ILLUMINATING-GAS.

SPECIFICATION forming part of Letters Patent No. 246,962, dated September 13, 1881.

Application filed September 17, 1880. (No model.)

*To all whom it may concern:*

Be it known that I, PHILIP W. MACKENZIE, of Blauveltville, in the county of Rockland and State of New York, have invented certain new and useful Improvements in Apparatus for Producing Illuminating-Gas, of which the following is a specification.

This invention relates to the production of a rich gas, suitable for illumination and other purposes, by the process of first generating in a suitable furnace a lean gas—such as a mixture of carbonic oxide and hydrogen—and afterward enriching such gas by the addition to it, while in a highly-heated state, of highly-heated vapor or gas, which is obtained by the distillation of a liquid hydrocarbon—such as naphtha—the vapor or gas last mentioned being converted and incorporated into a permanent gas with the gas first mentioned.

My invention consists in the combination, in a gas-producing apparatus, of a generator or furnace, a hydrocarbon evaporator and converter having one or more apertures for the escape of hydrocarbon vapor, an interposed mixing-chamber for the gas and vapor from said generator and said evaporator and converter, one or more tubes passing down through the evaporator and converter for carrying off the permanent or perfect gas, and also for vaporizing or converting the hydrocarbon liquid in the evaporator or converter.

My invention also consists in certain novel features in the construction of the evaporator and converter—namely, in providing it with an outer casing, in which an annular space is formed around it, down which the permanent or completed gas may pass, as well as through the tubes aforesaid, thereby increasing the surface with which the gas comes in contact, to effect the more rapid vaporization of the hydrocarbon liquids and the more rapid cooling of the permanent gas. Such annular space also provides for the equal expansion of the shell and the tubes of the evaporator and converter, and prevents the rupture of the joints of the tubes and consequent leakage.

It further consists in providing the evaporator and converter with a jacket for a heating agent—such as steam or hot air—for heating the hydrocarbon liquid in starting the apparatus and before the production of lean gas in the generator, so that upon such production being commenced there will be a sufficient supply of hydrocarbon vapor to mix or combine therewith; also, in an annular passage surrounding the evaporator or converter near its lower end, and provided with numerous apertures, through which the hydrocarbon liquid is introduced into the evaporator and converter around its circumference in quantities as desired. This annular passage may consist of a jacket surrounding the evaporator and converter, near its lower end, with perforations in the shell of the evaporator and converter; or it may consist of an annular pipe outside the evaporator or converter provided with a number of radial branches leading to the shell thereof; also, in a novel arrangement of a pipe and branch pipes for conveying hydrocarbon vapors to the mixer or mixing-chamber, in which they are heated and combined with the lean gas escaping from the generator.

The invention also consists in certain novel details in the construction of the said mixer or mixing-chamber.

In the accompanying drawings, Figure 1 represents a vertical section of an apparatus consisting of a generator and converter and evaporator, with their proper connections, embodying my invention. Fig. 2 represents a horizontal section of the converter and evaporator upon the dotted line *x x*, Fig. 1. Fig. 3 represents a similar horizontal section upon the dotted line *y y*, Fig. 1. Fig. 4 represents a similar horizontal section upon the dotted line *z z*, Fig. 1; and Fig. 5 represents a vertical section of the mixer or mixing-chamber upon a larger scale.

Similar letters of reference designate corresponding parts in all the figures.

In the use of my apparatus any suitable furnace or generator may be employed for producing a lean gas composed of carbonic oxide and hydrogen. The generator here represented is one well adapted for the purpose, and consists of a furnace, A, lined with fire-brick or other refractory material, and provided with a grate, *a*, for the combustion of coal, coke, charcoal, or any other suitable combustible or fuel, which may be introduced through a filling-mouth, A'. The furnace proper is constructed or provided with a jacket, B, to which steam and oxygen or air are supplied by an injector, C, and which communicates with the furnace below the grate by ports or tuyeres $b$. Steam and hot air supplied to the jacket by the injector are heated by radiated heat from the furnace, and passing through the tuyeres and up through the grate, the hot air supplying the proper amount of oxygen for combustion, and the steam being decomposed to furnish the proper amount of hydrogen to combine with the carbonic oxide to produce a lean gas. The furnace is provided upon its exterior with annular flanges $c$, which retain the air and steam a much longer time in the jacket and effect their more thorough heating. These flanges form the subject of a separate application for Letters Patent. The generator is also constructed with a surrounding shell or casing, $d$, which retains a covering of non-conducting material—such as mineral wool or asbestus—around the generator, and prevents the loss of heat by radiation. The lean gas or mixture of hydrogen and carbonic oxide produced in the generator may pass through a pipe, D, to an evaporator and converter, or through a pipe, D', to be used as a heating-gas, for which purpose it is well adapted. The pipe D is prolonged sufficiently to enter a chamber, E, above the evaporator and converter F, arranged centrally therein, the chamber and the evaporator or converter both being preferably cylindrical. Outside the chamber E is an external casing, $e$, and interposed non-conducting material—such as asbestus or mineral wool—and the chamber is closed at the top by a cup-shaped cover, E', also filled with non-conducting material, and a seal-plate, $E^2$, placed over all and luted tight to prevent the escape of gas. The evaporator and converter is supported upon a base or bed, G, hereinafter to be more fully described.

The evaporator and converter F consists of a metallic shell of suitable strength and material and a series of tubes, $f$, passing through it from end to end, so as to permit the passage of gas downward through the evaporator and converter into the hollow base G. The evaporator and converter is somewhat smaller than the chamber E, and an annular space, $s$, is thus formed between the sides of the two, down which the gas may pass, as well as through the tubes.

Surrounding the evaporator and converter, preferably near the lower end thereof, is a jacket, H, provided with suitable inlet and outlet pipes, $g$ and $h$, through which a heating agent—such as steam or hot air—may pass into and from the jacket. The steam or hot air circulating through said jacket serves to vaporize the hydrocarbon in the evaporator and converter before the production of the permanent or perfected gas is commenced.

Around the lower part of the evaporator and converter is a second jacket or passage, I, smaller than that just described and below the latter, and provided with a suitable inlet-pipe, $i$, for hydrocarbon liquid, such as naphtha. The shell of the evaporator and converter opposite this jacket is filled with perforations, as shown most clearly in Fig. 3, and through these the hydrocarbon liquid is delivered, in just such quantities as may be desired, around the circumference of the evaporator and converter. In lieu of the aforesaid jacket I, I may employ an annular pipe, J, arranged entirely outside the outer casing of the evaporator and converter, and provided with a number of radial branches extending into the same. Either of these devices may be employed to introduce hydrocarbon liquid into the evaporator and converter, or any other means may be employed for a like purpose; but I prefer the jacket I.

Turning now to a description of the base G, upon which the evaporator and converter is supported, $j$ designates a plate dividing the said base, as shown clearly in Fig. 1.

K designates a pipe surrounding the base and having a number of radial branches or jets, through which water is discharged or showered into the base above the plate $j$, thereby washing and cooling the gas before it passes from the base. The base below the plate $j$ is filled with water, as shown, and from the said plate a number of pipes, $k$, lead downward below the level of water. After being sprayed or showered by water from the pipe K, the gas passes downward through the pipes $k$, and thence out through the hydraulic main L for further treatment.

Turning now to a description of the devices for mixing or combining the hydrocarbon vapors and the hydrogen and carbonic oxide from the generator, M designates a mixing-chamber situated in the pipe D between the generator and the evaporator and converter. This mixing-chamber has a central passage of the internal diameter of the pipe D, and a surrounding jacket or annular chamber, $l$. (Shown clearly in Fig. 5.) From the jacket or chamber $l$ extend a number of pipes or conduits, $m$, opening upwardly, and around which the lean gas from the generator may freely circulate.

N designates a pipe communicating with the jacket or annular chamber $l$ of the mixing-chamber M, and having within the chamber E a number of branches, $n$, leading from apertures in the upper end of the converter and evaporator to said pipe, the latter serving as a collector for all the branches, as shown clearly in Fig. 2. The pipe N is furnished with a suitable valve, O, by which the passage of hydrocarbon vapor through it may be properly regulated.

When it is desirous to start the apparatus the hydrocarbon liquid is admitted to the bottom of the converter, filling it not over one-quarter full, and steam or hot air is introduced into the jacket H, and by the heat thereof the hydrocarbon is vaporized, the valve O being closed meanwhile. The fire is also started in the generator, and as soon as the fire is under proper headway the door in the ash-pit below the grate $a$ is tightly closed, and a mixture of hydrogen and carbonic oxide produced in a highly-heated state. The valve O in the pipe N is then opened, and the hydrocarbon vapors passing through said pipe fill the jacket or annular chamber *l* in the mixing-chamber M, and are still further heated by the lean gas passing through the passage in said mixing-chamber. From the jacket or annular chamber *l* the heated hydrocarbon vapors pass through the outlet pipes or conduits *m*, become still further heated, and are in a proper condition to combine with the mixture of hydrogen and carbonic oxide and lean gas to produce a permanent or perfect gas of good illuminating power. After the hydrocarbon vapors or gas have been taken up by the lean gas to produce the permanent or perfected gas, the latter enters the chamber E and passes down around the evaporator and converter and through the tubes thereof to the base G, where it is washed and carried away through the hydraulic main, as aforesaid. When the permanent or perfected gas commences to pass freely through and around the evaporator and converter, its heat will be quite sufficient to vaporize the hydrocarbon liquid, and the steam may be shut off from the jacket H. As the operation proceeds the upper part of the converter F is heated, by the escaping perfected gas passing through it, to so high a temperature that much of the vapor of the hydrocarbon will be decomposed by the heat and converted into permanent gas, and what is not so decomposed will be so highly heated that it will be at once decomposed by the heat of the gas from the furnace A which it meets in the mixing-chamber M.

In the operation of this apparatus, while the permanent or perfected gas produces the evaporation of hydrocarbon liquid and the subsequent heating of the vapors to a very high degree, the perfected gas becomes, by the heat thus abstracted from it, partially cooled, and thus it will be seen that the heat of the permanent or perfected gas, which would otherwise be wasted in cooling, is utilized, and by thus cooling the gas the quantity of water required for its final cooling is very much reduced, and hence a double economy is obtained.

The employment of the heat of the perfected gas to evaporate and heat the vapors of the hydrocarbon liquid is no part of the invention, as I have made it the subject of a separate application for a patent, and do not here claim it.

What I claim as my invention, and desire to secure by Letters Patent, is—

1. The combination of a generator or furnace, a hydrocarbon evaporator and converter having one or more apertures for the escape of hydrocarbon vapor, and interposed mixing-chamber for the gas from said generator and the vapor from said evaporator and converter, and one or more tubes passing down through the evaporator and converter for carrying off the permanent or perfected gas, and also for vaporizing or converting the hydrocarbon liquid in the evaporator and converter by the heat of said gas, substantially as specified.

2. The combination of a generator or furnace, a hydrocarbon evaporator and converter having one or more apertures for the escape of hydrocarbon vapor, an interposed mixing-chamber for the gas from the generator and the vapor from the evaporator and converter, a casing or chamber forming an annular space around said evaporator and converter, and a tube or tubes passing through the same for the passage of the permanent gas downward and through the evaporator and converter, substantially as and for the purpose specified.

3. The combination of a generator or furnace, a hydrocarbon evaporator or converter having one or more apertures for the escape of hydrocarbon vapor, an interposed mixing-chamber for the gas from the generator and the vapor from the evaporator and converter, a tube or tubes passing through said evaporator and converter for the passage of the permanent gas down through the same, and a jacket for a heating agent provided with a suitable inlet and outlet, and surrounding the evaporator and converter, substantially as and for the purpose specified.

4. The combination of a generator, a hydrocarbon evaporator and converter having one or more apertures for the escape of hydrocarbon vapor, an interposed mixing-chamber for the gas from said generator and the vapor from said evaporator and converter, a tube or tubes passing through said evaporator and converter for the passage of permanent gas down through the same, a jacket for a heating agent surrounding said evaporator and converter, and a jacket or pipe surrounding said evaporator and converter having an inlet-pipe for hydrocarbon liquid and provided with apertures communicating with said evaporator and converter, substantially as and for the purpose specified.

5. The combination, with a hydrocarbon evaporator and converter provided with a tube or tubes for the downward passage of a permanent gas through it, of a base for said evaporator divided into upper and lower compartments, a pipe or pipes for showering water into said upper compartment, and a water-sealed pipe or pipes leading from said upper compartment to said lower compartment, substantially as and for the purposes specified.

6. The combination of a generator, a hydrocarbon evaporator and converter, a pipe connecting the two, a mixing-chamber in said pipe comprising a central passage for gas from the generator, a jacket or annular chamber, pipes or conduits leading from said jacket or chamber into said central passage, and a pipe or pipes for hydrocarbon vapor leading from said evaporator and converter to said jacket or annular chamber, substantially as and for the purpose specified.

7. The combination of a generator, a hydrocarbon evaporator and converter, the pipe D, connecting the two, the mixing-chamber M, comprising the jacket and pipes or conduits *m*, and the pipe N, provided with the branches *n* and the valve O, substantially as specified.

P. W. MACKENZIE.

Witnesses:
HENRY T. BROWN,
T. J. KEANE.